United States Patent
Foukas et al.

(10) Patent No.: US 11,812,518 B2
(45) Date of Patent: Nov. 7, 2023

(54) VIRTUALIZED RADIO ACCESS NETWORK (VRAN) DECODING AS A SERVICE

(71) Applicant: Microsoft Technology Licensing, LLC, Redmond, WA (US)

(72) Inventors: Xenofon Foukas, Cambridge (GB); Jincao Zhu, Salt Lake City, UT (US); Bozidar Radunovic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 16/950,411

(22) Filed: Nov. 17, 2020

(65) Prior Publication Data

US 2022/0159785 A1    May 19, 2022

(51) Int. Cl.
| | |
|---|---|
| *H04W 88/08* | (2009.01) |
| *H04W 24/02* | (2009.01) |
| *H04W 28/02* | (2009.01) |
| *H04W 88/12* | (2009.01) |
| *H04W 92/12* | (2009.01) |

(52) U.S. Cl.
CPC ......... *H04W 88/085* (2013.01); *H04W 24/02* (2013.01); *H04W 28/0268* (2013.01); *H04W 88/12* (2013.01); *H04W 92/12* (2013.01)

(58) Field of Classification Search
CPC ... H04W 88/085; H04W 88/12; H04W 92/12; H04W 28/0268; H04W 24/02
See application file for complete search history.

(56) References Cited

U.S. PATENT DOCUMENTS

| | | | |
|---|---|---|---|
| 7,248,693 B1 * | 7/2007 | Tretter | H04L 9/3234 380/278 |
| 7,957,532 B2 * | 6/2011 | Chen | H04W 12/033 380/278 |
| 11,393,324 B1 * | 7/2022 | Faraone | G08B 25/012 |
| 11,425,111 B2 * | 8/2022 | Smith | H04L 41/5003 |
| 11,425,592 B2 * | 8/2022 | Francini | H04W 80/02 |

(Continued)

FOREIGN PATENT DOCUMENTS

| | | | |
|---|---|---|---|
| CN | 104321997 B * | 8/2018 | .......... H04L 1/1887 |
| EP | 2781116 A1 | 9/2014 | |

OTHER PUBLICATIONS

"Study on new radio access technology: Radio access architecture and interfaces (Release 14)", In Technical Report of 3GPP 38.801, Mar. 2017, 92 Pages.

(Continued)

*Primary Examiner* — Parth Patel
(74) *Attorney, Agent, or Firm* — RAY QUINNEY & NEBEKER P.C; James Bullough

(57) ABSTRACT

The systems and methods relate to virtual radio access networks (vRANs). The systems and methods may offload a signal processing task of a physical layer from a vRAN server located at the far edge of a network nearby a base station to a remote location further away from the base station. The remote location may include higher level edge deployments of servers or a cloud deployment of servers. The system and methods may scale the vRAN server capacity by offloading the signal processing task to the remote location without compromising quality of service requirements or latency requirements of the user equipment or the applications.

20 Claims, 10 Drawing Sheets

(56) References Cited

U.S. PATENT DOCUMENTS

| | | | | |
|---|---|---|---|---|
| 2012/0224541 | A1* | 9/2012 | Yoshiuchi | H04W 16/10 370/329 |
| 2013/0136068 | A1* | 5/2013 | Johansson | H04W 88/085 370/329 |
| 2014/0314100 | A1* | 10/2014 | Song | H04L 45/7453 370/431 |
| 2015/0303950 | A1* | 10/2015 | Shattil | H04B 1/0003 370/328 |
| 2016/0253339 | A1* | 9/2016 | Ambrose | G06F 3/0689 707/693 |
| 2018/0103395 | A1* | 4/2018 | Gholmieh | H04W 28/065 |
| 2018/0242167 | A1* | 8/2018 | Bottari | H04W 92/00 |
| 2019/0098642 | A1* | 3/2019 | Baer | H04W 72/087 |
| 2020/0117772 | A1* | 4/2020 | Wenker | G06F 21/128 |
| 2020/0128371 | A1* | 4/2020 | Broz | H04W 4/44 |
| 2020/0128484 | A1* | 4/2020 | Su | H04W 48/20 |
| 2020/0221473 | A1* | 7/2020 | Krishnaswamy | H04W 72/0486 |
| 2020/0260500 | A1* | 8/2020 | Agiwal | H04W 74/004 |
| 2020/0367022 | A1* | 11/2020 | Tenny | H04W 4/029 |
| 2021/0006614 | A1* | 1/2021 | Oyman | H04L 65/70 |
| 2021/0049360 | A1* | 2/2021 | Yildiz | G02B 27/017 |
| 2021/0058473 | A1* | 2/2021 | Yerli | H04L 41/5003 |
| 2021/0067421 | A1* | 3/2021 | Kidd | H04L 49/101 |
| 2021/0136142 | A1* | 5/2021 | Dong | G06F 9/5094 |
| 2022/0038954 | A1* | 2/2022 | Ovadia | H04W 24/02 |
| 2022/0053308 | A1* | 2/2022 | Higuchi | H04L 67/101 |
| 2022/0086864 | A1* | 3/2022 | Sabella | H04W 36/0072 |
| 2022/0117015 | A1* | 4/2022 | DeFoy | H04W 8/26 |
| 2022/0141025 | A1* | 5/2022 | Bogineni | H04L 63/12 713/156 |
| 2022/0150998 | A1* | 5/2022 | Goldhamer | H04W 88/026 |
| 2022/0159785 | A1* | 5/2022 | Foukas | H04W 28/0268 |
| 2022/0167246 | A1* | 5/2022 | Lim | H04W 48/02 |
| 2022/0369215 | A1* | 11/2022 | Dees | H04W 76/12 |
| 2023/0093178 | A1* | 3/2023 | Guo | H04W 76/14 370/310 |

OTHER PUBLICATIONS

Marotta, et al., "Exploiting flexible functional split in converged software defined access networks", In Journal of Optical Communications and Networking, vol. 11, Issue 11, Nov. 2019, pp. 536-546.

"International Search Report and Written Opinion Issued in PCT Application No. PCT/US21/052747", dated Mar. 22, 2022, 18 Pages.

* cited by examiner

| Candidate List *1106* |
|---|
| Candidate *1102* – Fixed Length PHR CE |
| Candidate *1104* – Variable Length PHR CE |

VIRTUALIZED RADIO ACCESS NETWORK (VRAN) DECODING AS A SERVICE

CROSS-REFERENCE TO RELATED APPLICATIONS

N/A

BACKGROUND

The virtualized radio access network (vRAN) is the part of the mobile network architecture that provides the wireless connectivity to mobile users and runs on commodity hardware (e.g., x86 servers with hardware acceleration). The vRAN servers need to have a low latency network connection with the Radio Units (RUs) of the cells and must be deployed close to them at the far edge of the network, creating significant constraints regarding the size and the power consumption that the vRAN servers can have.

Typically, vRAN deployments must be provisioned with enough compute resources (number of CPU cores, memory, etc.) for the peak capacity of the served cells. However, traffic fluctuations of the cells (e.g., diurnal changes in traffic demand) lead to the underutilization of the edge compute resources on the average case. Similarly, cells can experience large increases in traffic loads for short periods of time (e.g., for a few hours in the case of crowded events). As a result, edge server deployments are most of the times overprovisioned, leading to inefficiencies in terms of their compute capacity, energy consumption and size (and consequently cost).

SUMMARY

In accordance with one aspect of the present disclosure, a method is disclosed that includes receiving, at a virtual radio access network (vRAN) server, codeblocks of data from a user equipment in communication with a base station located near the vRAN server. The method also includes determining whether to decode the codeblocks locally using a local decoder of the vRAN server or decode the codeblocks remotely using a remote decoder at a remote location. The remote location is located further away from the base station relative to the vRAN server. The method also includes sending the codeblocks to the local decoder in response to determining to decode the codeblocks locally. The method also includes sending the codeblocks to the remote decoder in response to determining to decode the codeblocks remotely. The method also includes identifying control information contained in decoded codeblocks. The method also includes sending the control information to a medium access control (MAC) layer of the vRAN server.

Determining to decode the codeblocks locally may be based on a quality of service requirement for the user equipment or a quality of service requirement of an application being accessed by the user equipment.

The quality of service requirement may be identified by comparing a quality of service class identifier (QCI) or a quality of service flow identifier (QFI) to a threshold level. The quality of service requirement may also be identified by determining to decode the codeblocks locally in response to the QCI or the QFI exceeding the threshold level. The quality of service requirement may also be identified by determining to decode the codeblocks remotely in response to the QCI or the QFI being below the threshold level.

The quality of service requirement may be identified by comparing a slice identification of the user equipment to a group of slice identifications of devices that belong to a low latency requirement. The quality of service requirement may also be identified by determining to decode the codeblocks locally in response to the slice identification matching the group of slice identifications. The quality of service requirement may also be identified by determining to decode the codeblocks remotely in response to a match not occurring between the slice identification and the group of slice identifications.

Determining to decode the codeblocks locally may be based on identifying the codeblocks as containing control information. Determining to decode the codeblocks remotely may be based on the codeblocks not containing the control information.

Identifying the control information contained in the decoded codeblocks may further include receiving in-phase and quadrature (IQ) samples of the codeblocks being decoded remotely at the remote decoder, inferring a predicted outcome of decoding for the codeblocks by comparing an error vector magnitude (EVM) of the IQ samples to a threshold level, and sending the predicted outcome of the decoding as the control information prior to the decoding of the codeblocks.

The remote location may be one of an edge deployment with a plurality of servers or a cloud deployment with a plurality of servers.

In accordance with another aspect of the present disclosure, a virtual radio access network (vRAN) server is disclosed that includes a demodulator component that receives codeblocks of data from a user equipment in communication with a base station located near the vRAN server. The virtual radio access network (vRAN) server also includes a local decoder that decodes the codeblocks locally at the vRAN server. The virtual radio access network (vRAN) server also includes a codeblock dispatcher component that determines whether to decode the codeblocks locally using the local decoder or decode the codeblocks remotely using a remote decoder at a remote location. The codeblock dispatcher component may send the codeblocks to the local decoder in response to determining to decode the codeblocks locally and may send the codeblocks to the remote decoder in response to determining to decode the codeblocks remotely. The virtual radio access network (vRAN) server also includes a medium access control (MAC) uplink (UL) dispatcher component that receives decoded codeblocks from the local decoder or the remote decoder, identifies control information in the decoded codeblocks, and sends the control information to a MAC layer of the vRAN server.

The codeblock dispatcher component may use a quality of service requirement for the user equipment or a quality of service requirement of an application being accessed by the user equipment in determining whether to decode the codeblocks locally or remotely.

The codeblock dispatcher component may identify the codeblocks that contain control information, send the codeblocks to decode locally in response to the codeblocks containing the control information, and send the codeblocks that do not include the control information to decode remotely.

The MAC UL dispatcher component may identify the control information contained in the decoded codeblocks by inferring a predicted outcome of decoding for the codeblocks by comparing an error vector magnitude (EVM) of in-phase and quadrature (IQ) samples of the codeblocks received to a threshold level and sending the predicted outcome of the decoding as the control information prior to the decoding of the codeblocks.

The MAC UL dispatcher component may create a new MAC protocol data units (PDU) packet with only the control information and sends the control information to the MAC layer using the new MAC PDU packet.

The remote location may be one of an edge deployment with a plurality of servers located further away from the base station relative to the vRAN server or a cloud deployment with a plurality of servers located further away from the base station relative to the vRAN server.

The vRAN server may be an energy efficient small form server.

In accordance with another aspect of the present disclosure, a method is disclosed that includes receiving, at a virtual radio access network (vRAN) server, traffic from a user equipment in communication with a base station located near the vRAN server. The method also includes determining to decode a portion of the traffic locally using a local decoder and to offload another portion of the traffic for remote decoding at a remote location located further away from the base station relative to the vRAN server. The method also includes identifying at least one candidate for a control element header in a string of bits of a decoded codeblock received from the local decoder. The method also includes creating a candidate list with the at least one candidate for the control element header. The method also includes selecting a first candidate control element header in the candidate list and decoding the string of bits using the first candidate control element header. The method also includes determining whether decoding the string of bits using the first candidate control element header is successful. The method also includes identifying control information for a control element in the decoded codeblock in response to the decoding being successful.

The method may further include creating a protocol data units (PDU) packet with the control information for the control element and sending the PDU packet with the control information to a medium access control (MAC) layer of a virtual radio access network (vRAN) server.

The method may further include determining that the decoding of the string of bits using the first candidate control element header is unsuccessful in response to receiving a decoding error. Determining that the decoding of the string of bits using the first candidate control element header is successful in response to reaching an end of the string of bits without receiving the decoding error.

Identifying the at least one candidate for the control element header may further include comparing a portion of the string of bits to a plurality of values of the control element header and identifying the at least one candidate for the control element header in response to the portion of the string of bits matching one value of the plurality of values of the control element header.

Identifying the at least one candidate for the control element header may further include comparing a next portion of the string of bits to the plurality of values of the control element header and identifying a next candidate for the control element header in response to the next portion of the string of bits matching one value of the plurality of values of the control element header. The candidate list may include the at least one candidate for the control element header and the next candidate for the control element header.

The method may further include selecting a next candidate control element header in the candidate list in response to the decoding being unsuccessful. The method may further include decoding the string of bits using the next candidate control element header. The method may further include determining whether the decoding of the string of bits using the next candidate control element header was successful. The method may further include identifying the control information for the control element in the decoded codeblock in response to the decoding being successful.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
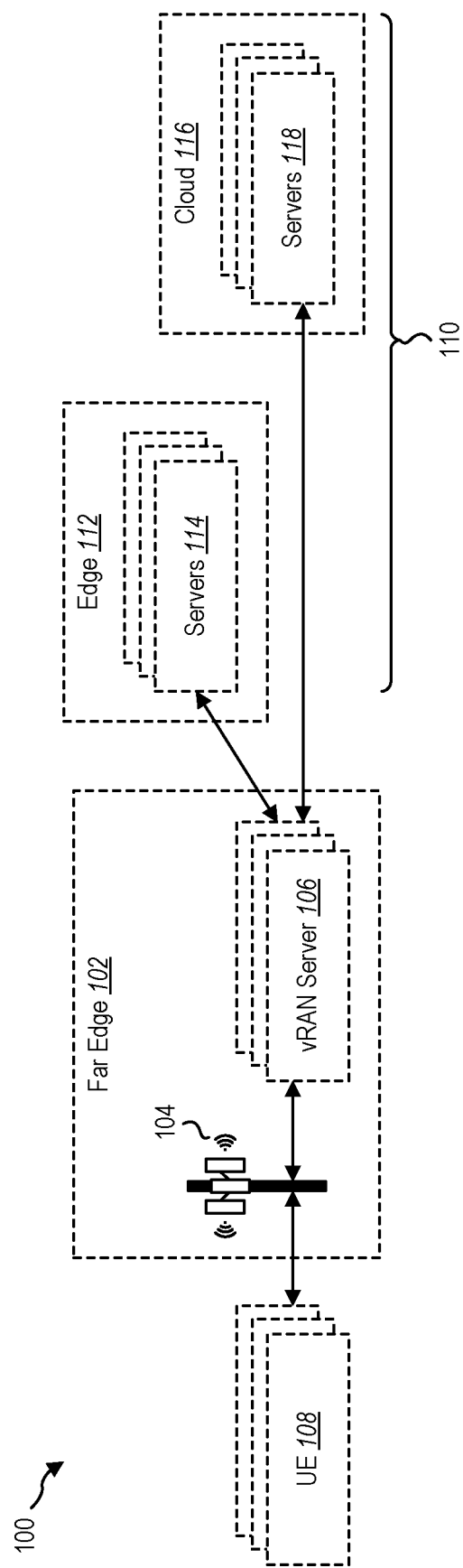
FIG. 1 illustrates an example environment for use with vRANs in accordance with an implementation of the present disclosure.

The present disclosure generally relates to virtualized radio access networks (vRANs). vRANs are part of the mobile network architecture that provides the wireless connectivity to mobile users and runs on commodity hardware (e.g., x86 servers with hardware acceleration). The vRAN servers perform the signal processing for the data being transmitted from a base station to one or more user equipment (UE) devices and/or received at the base station from one or more UEs. In addition, the vRAN servers make decisions for allocating radio resources to the UEs. As the traffic load of the UEs increases, the compute demands on the vRAN servers also increase (e.g., number of CPU cores, memory, etc.).

The far edge of the network may be as close to the antennas as possible. The vRAN servers need to have a low latency network connection with the Radio Units (RUs) of the cells and must therefore be deployed close to the antennas at the far edge of the network. For example, the vRAN servers may be deployed within a few kilometers of the antennas (e.g., 2 to 10 kilometers from the antennas).

Provisioning vRAN servers at the far edge may have significant constraints regarding the size and the power consumption of the vRAN servers. Physical space might be limited near the antennas and/or real estate may be expensive near the antennas. As such, fewer vRAN servers may be provisioned at the far edge of a network.

Typically, vRAN deployments must be provisioned with enough compute resources (number of CPU cores, memory etc.) for the peak capacity of the served cells. However, traffic fluctuations of the cells (e.g., diurnal changes in traffic demand) lead to the underutilization of the edge compute resources on the average case. Similarly, cells can experience large increases in traffic loads for short periods of time (e.g., for a few hours in the case of crowded events). As a result, edge server deployments are most of the times overprovisioned, leading to inefficiencies in terms of their compute capacity, energy consumption and size (and consequently cost).

The present disclosure improves the efficiency of vRANs of (4G/5G) and beyond mobile networks, by allowing vRANs to scale capacity beyond the capabilities offered by the far edge servers hosting the vRANs. The present disclosure enables the offloading of part of the vRAN processing to a remote location, such as, higher-level edge deployments or to the central cloud. The higher-level edge deployments or the central cloud provide an abundance of compute resources, allowing the far edge vRAN servers to be provisioned with less compute resources, improving efficiency and reducing cost. The present disclosure includes several practical applications that provide benefits and/or solve problems associated with vRANs.

The present disclosure offloads a signal processing task of the physical layer. In an implementation, the present disclosure offloads the decoding operation (decoding-as-a-service—DaaS), which is a signal processing task of the physical layer of the vRAN (Turbo decoding in 4G and LDPC decoding in 5G). The decoding task is the most demanding task of the vRAN in terms of compute resources (e.g., greater than 50% of the total vRAN processing requirements), while the decoding task also has relatively low bandwidth requirements from the network connecting the far edge to the remote location (e.g., higher level edge deployments or to the central cloud).

However, vRAN operations are time sensitive and offloading the decoding operation to the remote location creates a number of timing-related challenges. One timing related challenge relates to quality of service (QoS) of applications. Some types of traffic flows served by the vRAN have low latency requirements (e.g., ultra-reliable and low latency communications (URLLC) services and augmented reality (AR)/virtual reality (VR) applications). Offloading the decoding of such flows to the remote location would introduce significant delays, which would be unacceptable for the offered service.

Another timing related challenge relates to uplink retransmissions. The vRAN base stations must provide feedback for each uplink transmission of a User Equipment (UE) using Hybrid Automatic Repeat Request (HARQ) after performing decoding of the received packets. This feedback comes in the form of an ACK/NACK message that designates to the UE whether it needs to perform a retransmission or not. The base station has limited time to provide such feedback, which can vary (e.g., 1 ms to 16 ms), depending on the radio access technology (4G/5G) and configuration. The offloading of the decoding operation to the remote location (e.g., higher level edge deployments or to the cloud) can lead to violations of HARQ time constraints. The base station will have to send the HARQ feedback before the decoding operation is actually complete.

Another timing related challenge relates to uplink control information (UCI) and UE feedback. Cellular uplink has two channels, a control (PUCCH) channel and a data (PUSCH) channel. Decoding of the data channel is more challenging for offloading. However, when the UEs have to send uplink control information and other feedback to the base station, the uplink control information and other feedback are occasionally multiplexed on radio resources that are in the same region of the spectrum as the uplink user channel (PUSCH). For example, the uplink control information may be multiplexed on the resource elements that are allocated for the PUSCH. The uplink control information and other feedback includes information multiplexed into the resource elements allocated to the UE (e.g., scheduling requests, HARQ feedback for downlink transmissions, CSI), as well as feedback integrated as Control Elements (CEs) to the UE's medium access control (MAC) protocol data units (PDU) (e.g., buffer status reports and power headroom). The increased delay in the offloading of the decoding operation to the remote location means that the UCI and other feedback will be outdated once received by the base station, affecting the control loops using the UCI and other feedback. A significant impact in the performance of the UE may occur, such as, degraded throughput due to outdated signal quality measurements (CQI) or misconfigured power levels, as well as violation of HARQ deadlines and reduced throughput due to missed scheduling requests.

The present disclosure solves the timing related challenges by distributing the traffic flows of users across the far-edge deployment and the higher-level edge and/or central cloud based on the QoS requirements of the flows. Packets corresponding to flows with low latency requirements (e.g., AR/VR, URLLC) remain at the base station and are decoded locally, while packets corresponding to all other flows are offloaded to the remote location. The classification of flows and the decision to offload is made based on information from a number of sources, including the a quality of service class identifier (QCI)/quality of service flow identifier (QFI) for 4G and 5G correspondingly, as well as the type of slice that the UE belongs to (if network slicing is supported).

In the case of offloaded data packets, the base station provides HARQ feedback (ACK/NACK) to the UE for uplink transmissions by relying on the demodulation quality (which always occurs locally with minimal latency), rather than on the outcome of the decoding operation.

UCI feedback (scheduling requests, CSI, HARQ ACK/NACK) from the UE is always decoded locally to minimize latency even if multiplexed on the same radio resources as the PUSCH. This is possible, as the exact time for receiving UCI is known by the base station a priori and the exact resources used for UCI can be calculated in the beginning of the reception slot. Moreover, feedback information contained in MAC CEs, like buffer status reports and power headroom, are also decoded locally. The present disclosure predicts the position of the CEs in the resource blocks allocated to the UE and decodes the corresponding codeblocks locally.

Currently, in the RAN space decoding is performed in the same location as the rest of the high-PHY operations (e.g., demodulation, descrambling, de-mapping, etc.). On one end of the design space, all high-PHY operations can be performed at the base station site at the far-edge. This introduces the challenge previously discussed, regarding the need to overprovision the far-edge sites to accommodate the sporadic heavy loads that must be accommodated by the mobile network, which leads to a significant underutilization of the edge resources on the average case. On the other end of the design space in Cloud-RAN (C-RAN) solutions, processing of the high-PHY operations are fully offloaded to a cloud deployment. In contrast, the present disclosure, C-RAN deployments present ultralow latency constraints (<200 us) in the fronthaul network for the communication of the cloud performing the PHY operations to the RUs, as they need to be able to accommodate all operations and services of the RAN with the same configuration (e.g., PRACH, URLLC service, etc.).

The present disclosure provides enough flexibility to scale up the RAN resources through the use of a higher level edge or cloud when needed, without compromising the low latency QoS required by some traffic flows and with minimal impact to the throughput achieved by applications with packets offloaded for decoding. The present disclosure may enable vRAN services to run at the far edge using low cost, energy efficient, small form factor hardware. For example, the vRAN servers provisioned at the far edge of the network may have a smaller form factor and may be more energy efficient.

As such, the present disclosure provides the ability to scale up RAN capacity on demand by offloading the compute-intensive operation of decoding to higher level edge/cloud deployments. In addition, the present disclosure introduces mechanisms for deciding when to perform the decoding operation locally or remotely to not affect the QoS of applications.

Referring now to FIG. 1, illustrated is an example environment 100 for use with vRANs that includes a far edge 102 of a network. The far edge 102 includes a base station 104 in communication with one or more vRAN servers 106.

The vRAN servers 106 provide the wireless connectivity to one or more user equipment (UE) 108 in communication with the base station 104. UEs 108 may include any device with wireless internet connectivity, such as, but not limited to, mobile phones, computers, tablets, gaming devices, and/or headsets.

In addition, the vRAN servers 106 perform the signal processing for the data being transmitted from the base station 104 to the UEs 108 and/or the data received at the base station 104 from the UEs 108. The vRAN servers also make decisions for allocating radio resources to the UEs. The vRAN servers 106 at the far edge 102 may also be more energy efficient with a smaller form factor. In an implementation, the vRAN servers 106 may be an x86 server with hardware acceleration.

The vRAN servers 106 are located nearby the antennas of the base station 104. The vRAN servers 106 need to have a low latency network connection with the Radio Units (RUs) of the base stations 104. As such, the vRAN servers 106 located far edge 102 of the network may be within a few kilometers of the base station 104. For example, the vRAN servers 106 may be located within a 2 to 10 kilometers from the base station 104.

Environment 100 may also include one or more remote locations 110 in communication with the far edge 102. The remote locations 110 may include a higher level edge 112 deployment of servers 114 located further away from the base station 104. For example, the edge 112 may be located within 11 to 200 kilometers from the base station 104. The edge 112 may include preexisting data centers with larger spaces that allow more servers. The servers 114 located at the edge 112 may be more powerful relative to the vRAN servers 106 located at the far edge 102. As such, the edge 112 may include bigger deployments of servers 114 and may provide benefits of pulling more resources for processing the vRAN workloads. However, the edge 112 is further away from the base station 104 relative to the far edge 102, as such, latency may be introduced to any processing performed at the edge 112 for the vRAN workloads.

The remote locations 110 may also include the cloud 116 with large deployments of servers 118 available for processing the vRAN workloads. The cloud 116 may be in any location remote from the base station 104. As such, latency may be introduced to any processing performed at the cloud 116 for the vRAN workloads, depending on the distance between the cloud 116 and the base station 104.

The latency introduced by using the remote locations 110 may violate timing requirements for the vRAN workloads. Certain operations of the vRAN workloads may have strict timing requirements for communicating with the base station 104. For example, operations may need to complete within 10 ms. Thus, the vRAN workloads may be unable to run further out in the network at the remote locations 110 because the latency introduced in the processing violates the deadline requirements for communicating with the base station 104.

Available physical space at the far edge 102 of the network may be limited nearby the base stations 104. The vRAN servers 106 located at the far edge 102 may be smaller and may have less compute power. For example, vRAN servers 106 at the far edge 102 may include 8 or 10 cores as compared to servers 114 at the edge 112 that include 40 cores. In addition, the vRAN servers 106 may be more energy efficient.

The vRAN servers 106 located at the far edge 102 may be able to serve the average traffic at the base station 104 for the UEs 108, but may be unable to support higher levels of demand in traffic (e.g., during busy time periods of the day or peak capacity). As such, when a surge occurs in traffic for the UEs 108, the vRAN servers 106 may offload a portion of the processing to the servers 114, 118 at the remote locations 110 to handle the surge in traffic.

Figure 2:
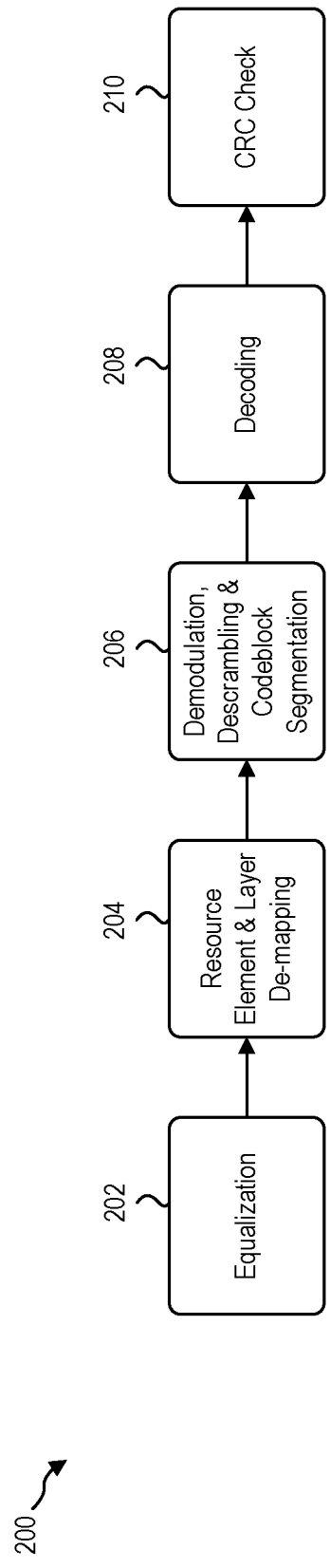
FIG. 2 illustrates an example processing task chain of the physical layer performed by a vRAN server for uplink vRAN workloads in accordance with an implementation of the present disclosure.

Referring now to FIG. 2, illustrated is an example processing task chain 200 of the physical layer signal processing tasks the vRAN servers 106 (FIG. 1) perform for uplink vRAN workloads. The processing task chain 200 may be performed on traffic coming from the UEs 108 (FIG. 1) going to the network. The signal processing tasks of the physical layer is the most demanding of the compute for the vRAN workloads. For example, the signal processing tasks may include an equalization task 202, a resource element and layer de-mapping task 204, a demodulation, descrambling, and codeblock segmentation task 206, a decoding task 208, and/or a CRC check task 210. Additional processing tasks not illustrated are performed by the vRAN servers 106 when processing the vRAN workloads.

The vRAN server 106 may perform the tasks included in the processing task chain 200 starting at the left with the equalization task 202, moving to the right, and ending with the CRC check task 210. For example, data is received from the UE 108, and the data is processed from left to right with the different signal processing tasks. Each task in the processing chain 200 has an input and an output. The output of the previous task in the processing task chain 200 is the input for the next task in the processing task chain 200.

The volume of data can change drastically for different tasks in the processing task chain 200. Thus, the compute cost for each task in the processing task chain 200 may differ based on the volume of data and the complexity of the task. Moreover, the demand for throughput differs between tasks. Tasks on the left portion of the processing task chain 200 may require more bandwidth relative to tasks on the right portion of the processing task chain 200.

Referring back to FIG. 1, in determining which task or tasks to offload from the vRAN servers 106 at the far edge 102 to the servers 114, 118 at the remote locations 110, the compute cost for each of the processing tasks may be evaluated, as well as the throughput needed for the task or tasks. For example, the decoding task 208 (FIG. 2) is a high computation intensive task (e.g., requires several cores to perform the decoding task) that has low bandwidth requirement. Thus, offloading the decoding task 208 to the remote location 110 may save compute costs while not using a large amount of bandwidth to shift the decoding task 208 to the remote location 110.

One example use case may include the decoding task 208 using 48 cores to perform the decoding task when a user is uploading 1.5 Gbps of traffic in a poor signal quality. A throughput of 9 Gbps may be needed to offload the decoding task. As such, offloading the decoding task 208 to the servers 114, 118 at the remote locations 110 may save many cores while not using a lot of bandwidth to shift the task to the remote locations 110.

As such, the environment 100 provides the ability to scale up RAN capacity on demand by offloading compute-intensive operations, such as the decoding task 208, to higher level edge 112/cloud 116 deployments. The environment 100 may enable vRAN services to run at the far edge using low cost, energy efficient, small form factor hardware.

Figure 3:
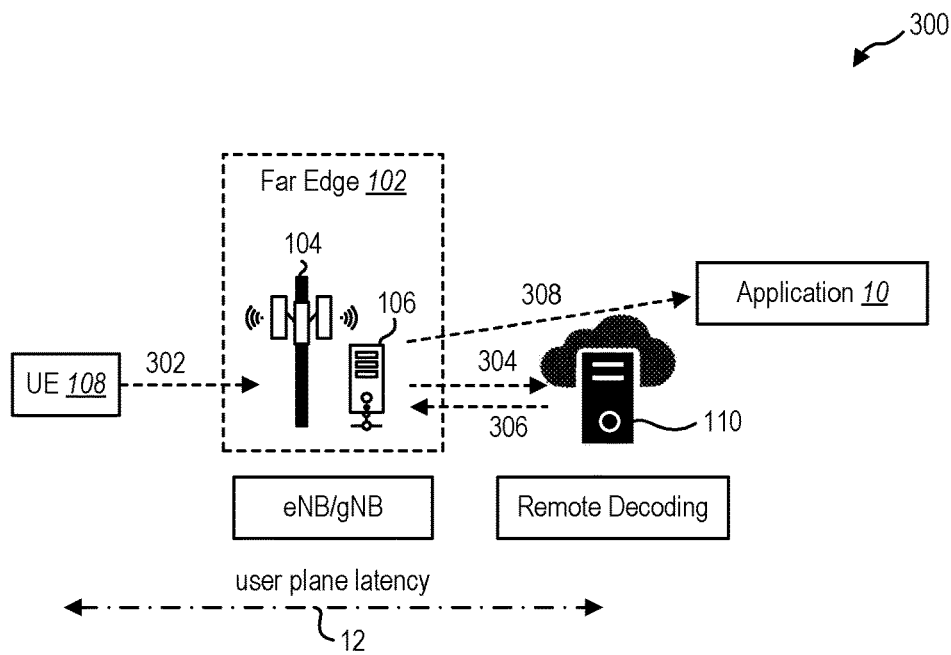
FIG. 3 illustrates an example environment illustrating timing related challenges for low latency applications when offloading a decoder task to a remote location in accordance with an implementation of the present disclosure.

Referring now to FIG. 3, illustrated is an example environment 300 that illustrates timing related challenges for low latency applications 10 when offloading the decoding task 208 (FIG. 2) to a remote location 110. One timing related challenge relates to applications 10 that have low latency requirements or quality of service (QoS) requirements. Some types of traffic flows served by the vRAN have low latency requirements (e.g., ultra-reliable and low latency communications (URLLC) services and augmented reality (AR)/virtual reality (VR) applications). For example, the applications 10 may have a latency requirement of less than 10 ms one way.

At 302, the UE 108 sends data to the far edge 102 (e.g., base station 104 and vRAN server 106). At 304, the vRAN server 106 sends the data to a remote location 110 (e.g., a higher level edge 112 and/or the cloud 116) for remote decoding. The remote location 110 performs the decoding of the data and, at 306, the remote location 110 sends the data back to the vRAN server 106. At 308, the vRAN server 106 may send the data to higher levels of the physical layers and to the application 10. For example, the user plane latency 12 for sending the data to the application 10 may increase to over 10 ms when the decoding is performed remotely at the remote location 110. If the decoding is performed locally at the far edge 102, the user plane latency 12 for sending the data to the application 10 may be between 1 to 4 ms.

As such, the user plane latency 12 for sending the data to the application 10 increases when performing the decoding remotely. The increase in the user plane latency 12 may be based on the location of the remote location 110. For example, the user plane latency 12 may increase as the distance increases to the remote location 110 (e.g., the farther away the remote location 110 is from the far edge 102, the more the user plane latency 12 may increase). Offloading the decoding of such flows to the remote location 110 may introduce significant delays, violating the latency requirements of the applications 10 and/or QoS requirements of the applications 10 and would be unacceptable for the offered service by the application 10. As such, the vRAN servers 106 may want to perform the decoding task 208 locally for certain applications 10 without offloading the decoding task 208 to a remote location 110.

Figure 4:
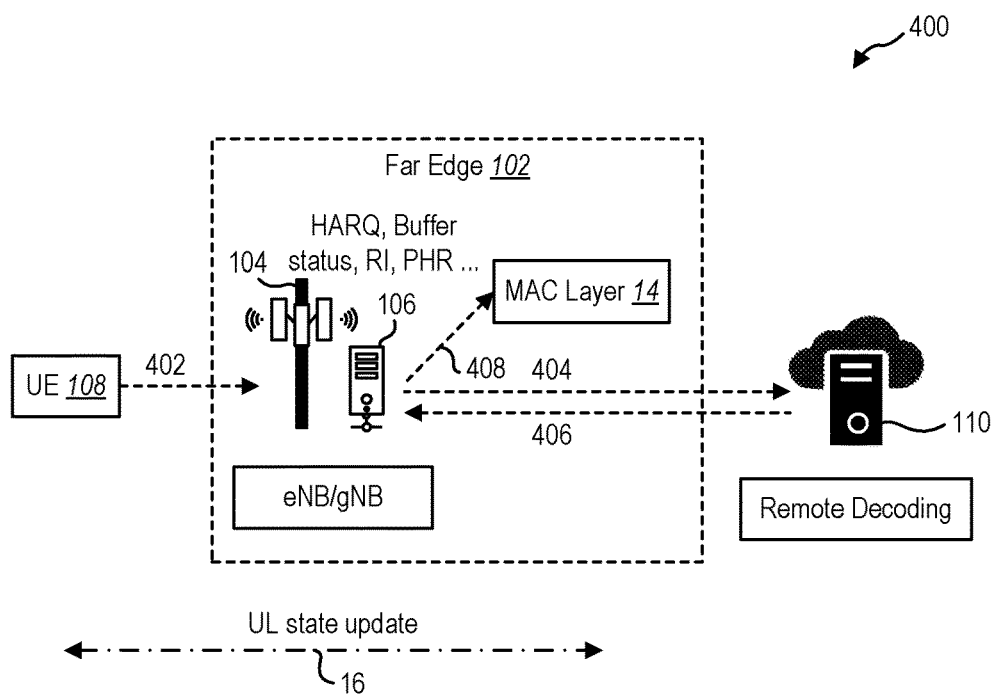
FIG. 4 illustrates an example environment illustrating timing related challenges for uplink (UL) state updates when offloading a decoder task to a remote location in accordance with an implementation of the present disclosure.

Referring now to FIG. 4, illustrated is an example environment 400 that illustrates timing related challenges for uplink (UL) state updates 16 when offloading the decoding task 208 (FIG. 2) to a remote location 110. Another timing related challenge relates to uplink control information (UCI) and UE feedback. Cellular uplink has two channels, a control (PUCCH) channel and a data (PUSCH) channel. When the UEs 108 send uplink control information and other feedback to the base station 104, the uplink control information and other feedback are occasionally multiplexed on the same radio resources as the uplink user channel (PUSCH).

The uplink control information and other feedback includes information multiplexed into the resource elements allocated to the UE 108 (e.g., scheduling requests, HARQ feedback for downlink transmissions, CSI), as well as feedback integrated as Control Elements (CEs) to the UE's MAC PDU (e.g., buffer status reports and power headroom). An example of control information that is part of the CEs may include the buffer status reports, which indicate how many bytes the UE 108 has in a queue that the UE 108 needs to send out. Another example of control information that is part of the CEs includes the power headroom (PHR), which indicates how much the transmission power can increase for the UE 108 if the signal quality drops. The PHR provides information about the capabilities of the device at a point in time and may be used to identify how much power the UE 108 may increase to improve a connection. One example of control information that is part of the UCI includes the rank indicator (RI) that indicates what size of MIMO the UE 108 may use. Another example of control information that is part of the UCI includes a Hybrid Automatic Repeat Request (HARQ) acknowledgement (e.g., an ACK or NACK message) for downlink packets sent by the base station 104. If the UE 108 receives the packets from the base station 104, the UE 108 sends an ACK message to the base station 104, and if the UE 108 did not receive the packets from the base station 104, the UE sends a NACK message to the base station 104.

At 402, the UE 108 sends data to the far edge 102 (e.g., base station 104 and vRAN server 106). At 404, the vRAN server 106 sends the data to a remote location 110 (e.g., a higher level edge 112 and/or the cloud 116) for remote decoding. The remote location 110 performs the decoding of the data and, at 406, the remote location 110 sends the data back to the vRAN server 106. At 408, the vRAN server 106 sends the control information to the MAC layer 14 and an UL state update 16 may be provided to the UE 108. The UL state update 16 may include the uplink control information (UCI) and UE feedback. The time to send the UL state update 16 to the UE 108 may increase to over 10 ms when the decoding is performed remotely. If the decoding is performed locally at the far edge 102, the time to send the UL state update 16 may be within 1 ms. The delay in sending the UL state update 16 may be based on the location of the remote location 110. For example, the delay may increase as the distance increases to the remote location 110 (e.g., the farther away the remote location 110 is from the far edge 102, the more the delay may increase).

The delay in providing the UL state update 16 as a result in the offloading of the decoding operation to the remote location 110 (e.g., higher level edge 112 deployments or to the cloud 116) means that the UCI and other feedback is outdated once received by the base station 104, affecting the control loops using the UCI and other feedback. One example use case may include a delay in receiving the HARQ. The base station 104 may not receive the ACK message by the deadline and may assume that the UE 108 missed the packet and the base station 104 may resend the packet. If the UE 108 already received the packet, resources are wasted with the base station 104 retransmitting the packet and the throughput of the UE 108 is degraded.

The UL state updates 16 may change quickly within a granularity of 1 ms. As such, a delay in sending the UL state update 16 may result in a significant impact in the performance of the UE 108, such as, degraded throughput due to outdated signal quality measurements (CQI) or misconfigured power levels, as well as violation of HARQ deadlines and reduced throughput due to missed scheduling requests.

Figure 5:
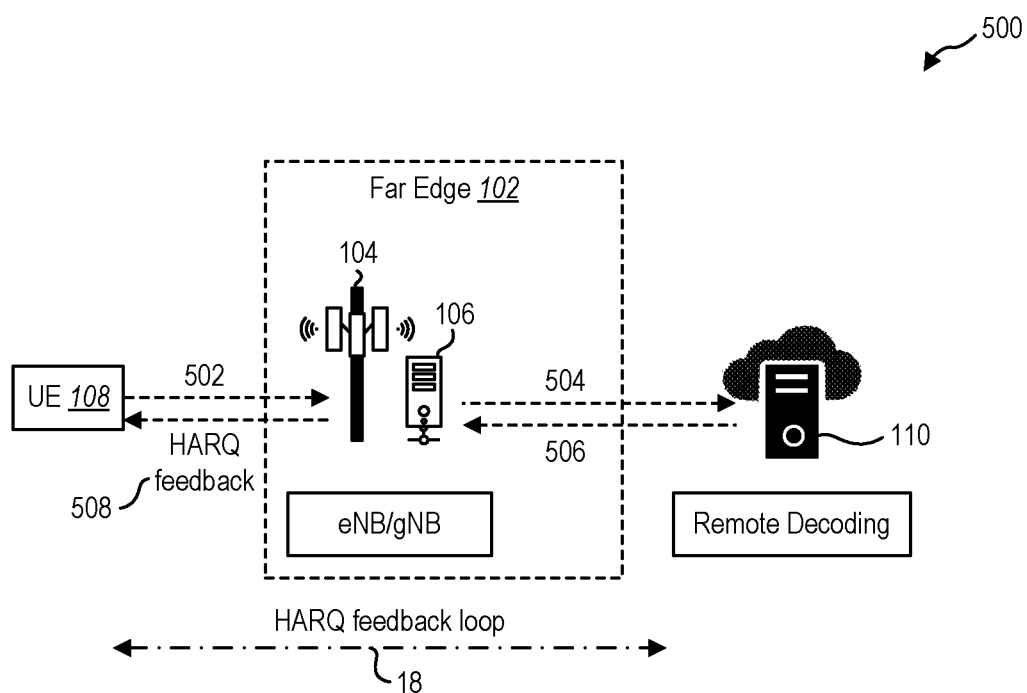
FIG. 5 illustrates an example environment illustrating timing related challenges for uplink (UL) retransmissions when offloading a decoder task to a remote location in accordance with an implementation of the present disclosure.

Referring now to FIG. 5, illustrated is an example environment 500 that illustrates timing related challenges for uplink (UL) retransmissions when offloading the decoding task 208 (FIG. 2) to a remote location 110. Another timing related challenge relates to uplink retransmissions. The vRAN servers 106 must provide feedback for each uplink transmission of the User Equipment (UE) 108 using Hybrid Automatic Repeat Request (HARQ) after performing decoding of the received packets. This feedback comes in the form of an ACK/NACK message that designates to the UE 108 whether the UE 108 needs to perform a retransmission or not. The base station has limited time to provide such feedback, which can vary (e.g., 1 ms to 16 ms), depending on the radio access technology (4G/5G) and the configuration.

At 502, the UE 108 sends a packet to the base station 104 at the far edge 102. The base station receives the packet. At 504, the vRAN server 106 sends the data to a remote location 110 (e.g., a higher level edge 112 and/or the cloud 116) for remote decoding. The remote location 110 performs the decoding of the data and, at 506, the remote location 110 sends the data back to the vRAN server 106. At 508, the base station 104 sends the HARQ feedback to the UE 108 (e.g., an ACK message if the base station 104 receives the packet and a NACK message if the base station 104 did not receive the packet). The time requirements for the HARQ feedback loop 18 may differ between 4G and 5G. For example, in 4G a deadline of 4 ms is required for the HARQ feedback loop 18, and in 5G a deadline of up to 16 ms is required for the HARQ feedback loop 18.

The offloading of the decoding operation to the remote location (e.g., a higher level edge 112 and/or the cloud 116) can lead to violations of HARQ time constraints. For example, the HARQ feedback loop 18 may take over 10 ms to send when decoding is offloaded to the remote location 110, as compared to the HARQ feedback loop 18 taking 1 to 4 ms when decoding is performed at the far edge 102. If the UE 108 does not receive the HARQ feedback loop 18 within the time constraints, the UE 108 will assume that the base station 104 did not receive the packet and will retransmit the packet to the base station 104, resulting in performance issues.

Figure 6:
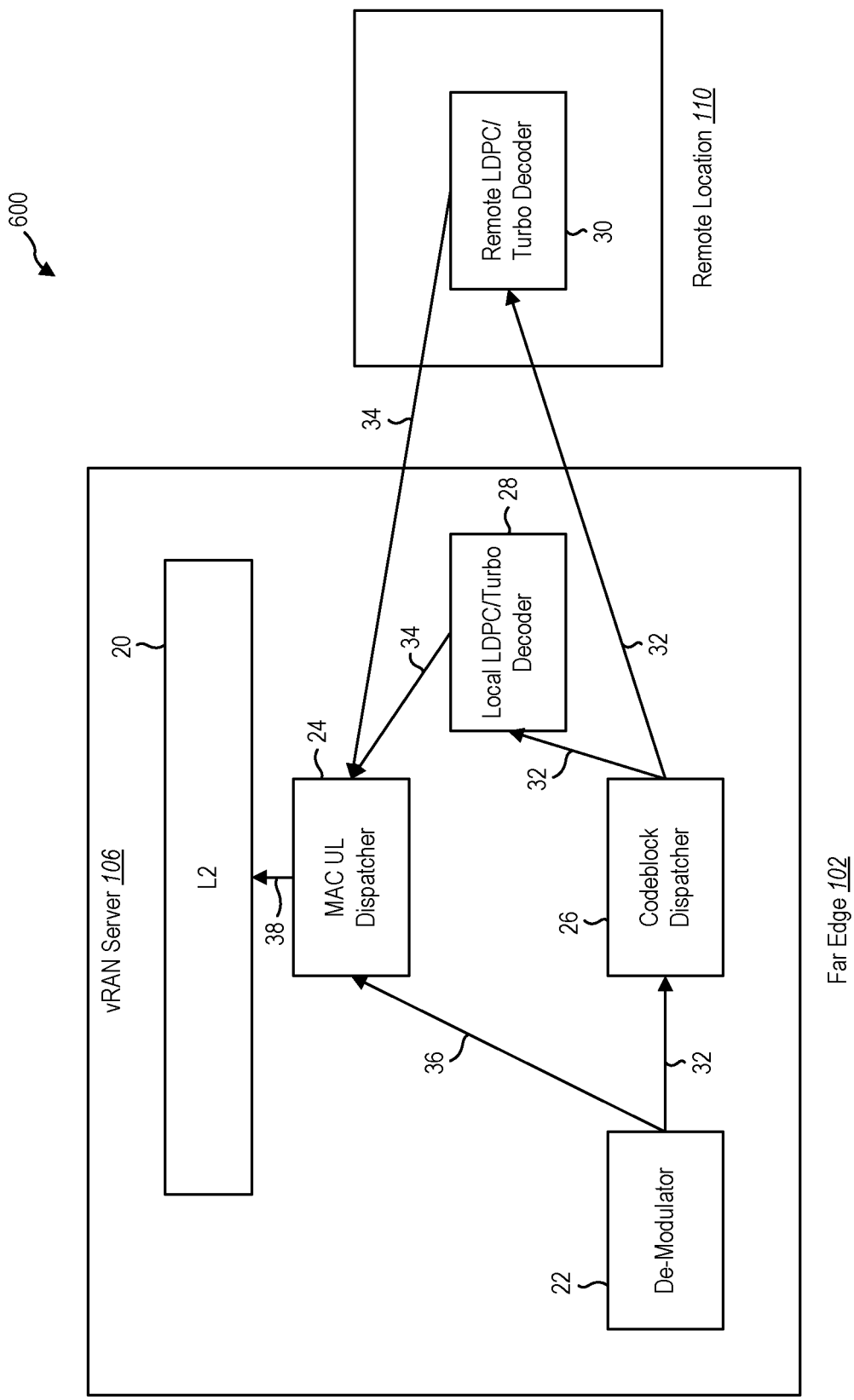
FIG. 6 illustrates an example environment for a vRAN server in accordance with an implementation of the present disclosure.

Referring now to FIG. 6, illustrated is an example environment 600 where a vRAN server 106 at the far edge 102 determines whether to offload a decoding operation to a remote location 110 or perform the decoding operation locally at the far edge 102. The vRAN server 106 may offload the decoding operation when the vRAN server 106 is unable to handle the traffic load of the UEs 108 in communication with the base station 104 (FIG. 1).

vRAN server 106 may include a demodulator component 22 that receives data transmitted from one or more UEs 108 in communication with a base station 104 located nearby the vRAN server 106. For example, the vRAN server 106 may be located at the far edge 102 of a network nearby the base station 104 (e.g., within a few kilometers of the antenna of the base station 104). The vRAN server 106 may be a small form factor server relative to larger servers 114 used at a datacenter of the edge 112 and/or larger servers 118 used in the cloud 116. Moreover, the vRAN server 106 may be more energy efficient relative to the servers 114 used at the edge 112 or the servers 118 used in the cloud 116. The demodulator component 22 demodulates the data into codeblocks 32 and may generate a plurality of codeblocks 32 varying in size depending on the amount of data. The amount of codeblocks generated by the demodulator component 22 may be based on the amount of data received from the UE 108. In addition, the codeblocks 32 for the data may vary in size. For example, the codeblocks 32 may be a fixed length or may vary in size.

The demodulator component 22 may send the codeblocks 32 to a codeblock dispatcher component 26 that determines whether to send the codeblocks 32 to a local decoder 28 to perform the decoding locally at the vRAN server 106 at the far edge 102 or to send the codeblocks 32 to a remote decoder 30 to perform the decoding remotely at the remote location 110. For 5G, the local decoder 28 and/or the remote decoder 30 is a low-density parity-check (LDPC) decoder. For 4G, the local decoder 28 and/or the remote decoder 30 is a turbo decoder.

The codeblock dispatcher component 26 may identify any latency requirements and/or QoS requirements for the codeblocks 32 in determining whether to perform the decoding locally or remotely. Different UEs 108 may have a different QoS requirements for receiving data. The UEs 108 may send quality indicators and/or other information of indicate the QoS requirement for the UE 108.

One example use case may include AR/VR headsets marked for low latency. The codeblock dispatcher component 26 may send the codeblocks 32 for the AR/VR headset to the local decoder 28 because the codeblocks 32 are critical in terms of time. In addition, different applications may have different latency requirements for data. For example, applications for uploading files may not have a latency requirement. The codeblock dispatcher component 26 may send the codeblocks 32 for the file upload applications to the remote location 110 because time may not be an issue in uploading files. As such, the codeblock dispatcher component 26 may make different decisions for different UEs 108 and/or different applications for where to decode the codeblocks 32.

The codeblock dispatcher component 26 may use the information received for the QoS requirements and/or the application latency requirements in determining whether to decode a particular codeblock 32 for a UE 108 locally or remotely. In an implementation, the codeblock dispatcher component 26 may use the a quality of service class identifier (QCI) for 4G and/or a quality of service flow identifier (QFI) for 5G for the codeblock 32 in determining whether the codeblock 32 has a guarantee bit rate requirement. If the QCI and/or the QFI is above a threshold level, the codeblock dispatcher component 26 may determine to have the local decoder 28 decode the codeblock 32 locally. If the QCI and/or the QFI is below the threshold level, the codeblock dispatcher component 26 may determine to have the remote decoder 30 decode the codeblock 32 remotely. The value of the threshold level may vary depending on the distance of the remote location 110 compared to the far edge 102 and an amount of latency introduced by the remote decoding at the remote location 110.

In an implementation, the codeblock dispatcher component 26 may use the slice identification (ID) of a UE 108 in determining whether to decode the codeblocks 32 for the UE 108 remotely or locally. The slice ID may identify whether a UE 108 is mapped as a device that has low latency requirements. The codeblock dispatcher component 26 may perform a check to determine whether the slice ID belongs to a device that has low latency requirements. If the slice ID of the UE 108 belongs to a group of devices identified as having low latency requirements, the codeblock dispatcher component 26 may send the codeblocks 32 for the UE 108 to the local decoder 28 for decoding locally. If the slide ID of the UE 108 is not included in the group of devices with low latency requirements, the codeblock dispatcher component 26 may send the codeblocks 32 for the UE 108 to the remote decoder 30 for decoding remotely.

The classification of flows and the decision to offload by the codeblock dispatcher component 26 is made based on information from a number of sources, including the QCI/QFI for 4G and 5G correspondingly, as well as the type of slice that the UE belongs to (if network slicing is supported). As such, the codeblock dispatcher component 26 may solve the timing related issues for QoS requirements and/or applications when offloading decoding remotely by keeping packets corresponding to flows with low latency requirements (e.g., AR/VR, URLLC) at the far edge 102 and decoded locally, while packets corresponding to other flows are offloaded to the remote location 110 and decoded remotely.

In addition, the codeblock dispatcher component 26 dispatches codeblocks 32 containing MAC CE information for decoding locally for low latency. The codeblock dispatcher component 26 may also partially solve the timing related issues relating to uplink control information (UCI) and UE feedback. The codeblock dispatcher component 26 may identify which codeblocks 32 contain control information. If the codeblocks 32 contain control information, the codeblock dispatcher component 26 sends the codeblocks 32 to the local decoder 28 for decoding locally. If the codeblocks 32 do not include control information, the codeblock dispatcher component 26 sends the codeblocks 32 to the remote decoder 30 for decoding remotely.

Control information, such as, HARQ and RI, is multiplexed with the user data in a way that the codeblock dispatcher component 26 may separate the control information from the user data. The codeblock dispatcher component 26 calculate resource elements used for UCI, such as, HARQ or CSI (e.g., CQI, RI), when multiplexed with user data on the same radio resources as the PUSCH based on the 3GPP Specification and sends the UCI resources for decoding locally. As such, the codeblock dispatcher component 26 may take advantage of the characteristics of the UCI and MAC control elements defined by the 3GPP Specification to identify and readily separate which codeblocks 32 contain control information to keep locally.

Once the local decoder 28 and/or the remote decoder 30 completes the decoding process, the decoded codeblocks 34 are sent to the MAC UL dispatcher component 24. The MAC UL dispatcher component 24 consolidates the decoded codeblocks 34 into a single MAC PDU packet to send to the L2 layer 20, the MAC layer.

When a low latency requirement exists for the UEs 108 and/or the applications (e.g., AR/VR applications), all of the codeblocks 32 are decoded locally and the MAC UL dispatcher component 24 constructs a single MAC PDU packet 38 including both the CEs and the user data. However, for UEs 108 without a low latency requirement and/or applications without a latency requirement, a portion of the traffic (e.g., the codeblocks 32 containing control information) is decoded locally, while another portion of the codeblocks 32 is offloaded to a remote location for decoding, and the MAC UL dispatcher component 24 separates the control information and data before sending the MAC PDU packet to the L2 layer 20. The MAC UL dispatcher component 24 constructs a new MAC PDU packet 38 that only includes the control information for the codeblocks 32 decoded locally. The MAC UL dispatcher component 24 sends the control information up to the MAC layer using the new MAC PDU packet 38 while the data is decoding remotely. By providing the control information for the codeblocks 32 decoded locally, UL state updates may be provided timelier before the remote decoding is finished.

When the decoded codeblocks 34 arrive from the remote decoder 30 another MAC PDU packet is created by the MAC UL dispatcher component 24 for the data arriving from the remote location 110 and the data decoded locally at the far edge 102. As such, the MAC UL dispatcher component 24 may solve the timing related issues relating to UCI and UE feedback by providing the new MAC PDU packet 38 with the control information of the codeblocks 32 decoded locally without waiting for the remote decoding to finish.

In addition, the MAC UL dispatcher component 24 may solve the timing related issues relating to uplink retransmission. The MAC UL dispatcher component 24 may predict the HARQ outcome without decoding the data. The MAC UL dispatcher component 24 may infer whether to send an ACK message or a NACK message from the base station 104 (FIG. 1) for the data received from the UE 108 based on the demodulation prior to decoding the data.

The demodulator component 22 may send in-phase and quadrature (IQ) samples 36 of the codeblocks 32 to the MAC UL dispatcher component 24. The MAC UL dispatcher component 24 may use the IQ samples 36 of the codeblocks 32 to make a prediction of whether the outcome for decoding the codeblocks 32 without decoding the codeblocks 32 using an error vector magnitude (EVM) classifier. The EVM is a metric used in the physical layer uses the IQ samples 36 to indicate the signal quality received from the base station 104. For example, if the IQ samples 36 received from the base station 104 are well aligned, the EVM classifier may indicate that the signal is clear from the base station 104. When the signal received from the base station 104 is well aligned, the decoding of the codeblocks 32 is more likely to succeed. If the IQ samples 36 received from the base station 104 are fuzzy or not well aligned, the EVM classifier may indicate that the signal is distorted from the base station 104. When the signal received from the base station 104 is distorted or not well aligned, the decoding of the codeblocks 32 is more likely to fail.

The MAC UL dispatcher component 24 may set a threshold level for the EVM classifier to use in predicting the outcome of decoding the codeblocks 32. If the EVM crosses the threshold level, the MAC UL dispatcher component 24 may predict that the decoding operation of the codeblocks 32 will fail and reports a NACK message. If the EVM is below the threshold level, the MAC UL dispatcher component 24 may predict a successful decoding operation of the codeblocks 32 and reports an ACK message. The MAC UL dispatcher component 24 may predict the HARQ outcome without decoding the data using the EVM classifier. As such, in the case of offloaded data packets, the base station 104 provides HARQ feedback (ACK/NACK) to the UE 108 for uplink transmissions by relying on the demodulation quality (which always occurs locally with minimal latency), rather than on the outcome of the decoding operation.

The components of the vRAN server 106 (e.g., the demodulator component 22, the codeblock dispatcher component 26, the local decoder 28, the MAC UL dispatcher component 24) may be located within the physical layer of the vRAN server 106. Each of the components 22, 24, 26, 28 of the vRAN server 106 may be in communication with each other using any suitable communication technologies. In addition, while the components 22, 24, 26, 28 of the vRAN server 106 are shown to be separate, any of the components or subcomponents may be combined into fewer components, such as into a single component, or divided into more components as may serve a particular implementation. Moreover, the components 22, 24, 26, 28 of the vRAN server 106 may include hardware, software, or both. For example, the components 22, 24, 26, 28 of the vRAN server 106 may include one or more instructions stored on a computer-readable storage medium and executable by processors of one or more computing devices. When executed by the one or more processors, the computer-executable instructions of one or more computing devices can perform one or more methods described herein. Alternatively, the components 22, 24, 26, 28 of the vRAN server 106 may include hardware, such as a special purpose processing device to perform a certain function or group of functions. Additionally, or alternatively, the components 22, 24, 26, 28 of the vRAN server 106 may include a combination of computer-executable instructions and hardware.

Environment 600 may include mechanisms for deciding when to perform the decoding operation locally or remotely to not affect the QoS of applications. Environment 600 solves the timing related challenges of offloading the decoding operation remotely by distributing the traffic flows of UEs 108 across the far-edge 102 and the remote location 110 based on the QoS requirements of the flows. Packets corresponding to flows with low latency requirements (e.g., AR/VR, URLLC) remain at the vRAN server 106 and are decoded locally, while packets corresponding to all other flows are offloaded to the remote location 110 for decoding remotely. As such, environment 600 provides flexibility to scale up the RAN resources through the use of a remote decoder 30 at a remote location 110 when needed, without compromising the low latency QoS required by some traffic flows and with minimal impact to the throughput achieved by applications with packets offloaded for decoding.

Figure 7:
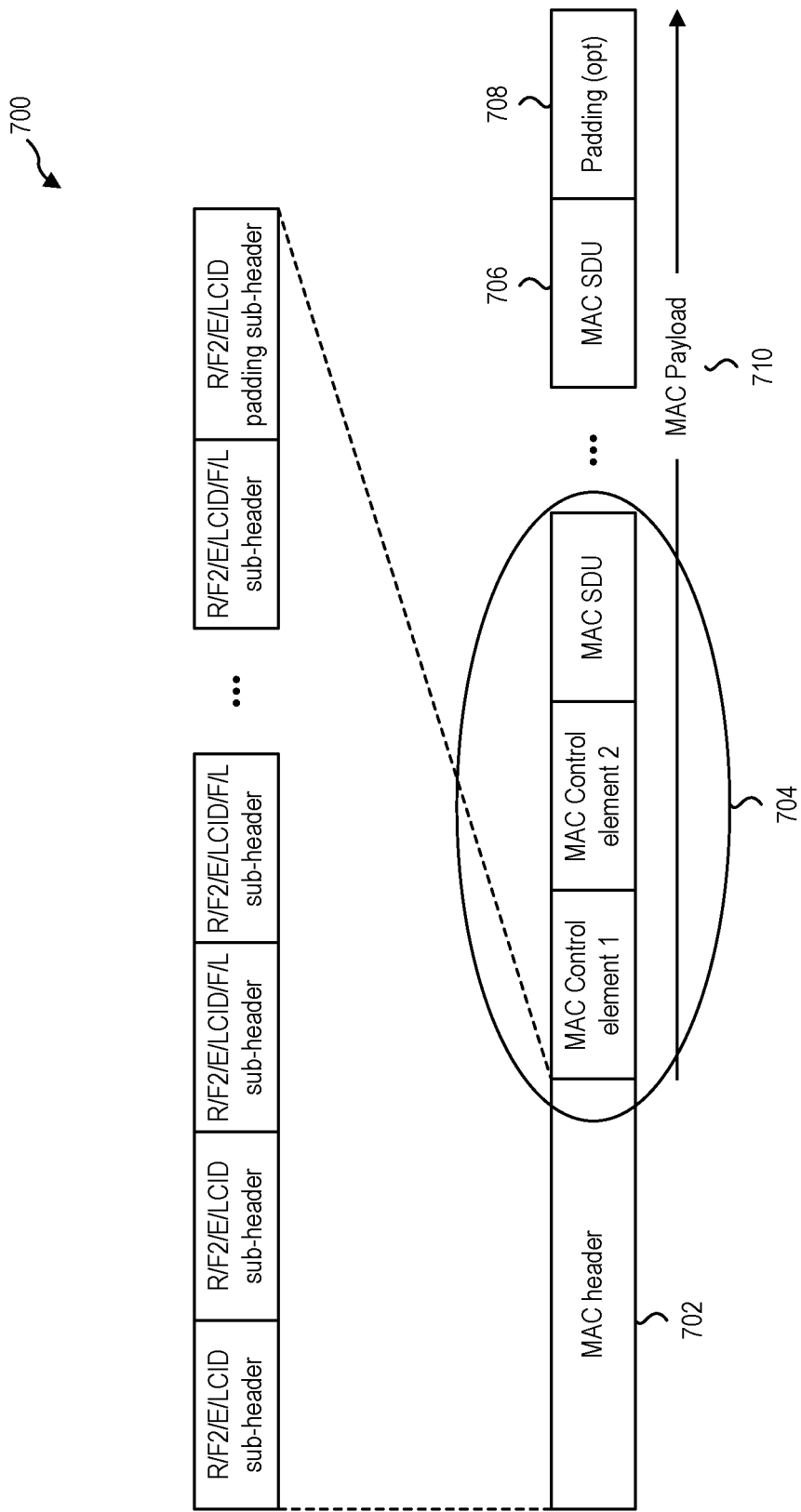
FIG. 7 illustrates an example UL MAC PDU for use with 4G in accordance with an implementation of the present disclosure.

Referring now to FIG. 7, illustrated is an example UL MAC PDU 700 for use with 4G. The MAC PDU 700 is constructed by concatenating a plurality of decoded codeblocks 34. The MAC PDU 700 may include a MAC header 702 and the MAC payload 710. The MAC payload 710 may include MAC control elements 704, MAC SDU 706 (the data), and/or padding 708.

In 4G, the UL MAC control elements 704 are appended at the start or beginning of the MAC PDU 700 after the MAC header 702, in the first codeblock. As such, in 4G, the codeblock dispatcher component 26 (FIG. 6) sends the first codeblock 32 to the local decoder 28 for decoding locally and may send the remaining codeblocks 32 to the remote decoder 30 for decoding remotely. The codeblock dispatcher component 26 may easily identify which codeblocks 32 contain the control element information to ensure that the codeblocks 32 with the control element information are sent to the local decoder 28 for decoding locally at the far edge 102 (FIG. 6).

The MAC UL dispatcher component 24 (FIG. 6) parses the decoded codeblock 34 received from the local decoder 28 to get the MAC control elements 704. In 4G, the MAC UL dispatcher component 24 may easily identify which decoded codeblocks 34 contain the control element information since the UL MAC control elements 704 are appended at the start or beginning of the MAC PDU 700 after the MAC header 702. The MAC UL dispatcher component 24 creates a new MAC PDU packet 38 (FIG. 6) with the MAC control elements 704 to report to the L2 layer 20.

Figure 8:
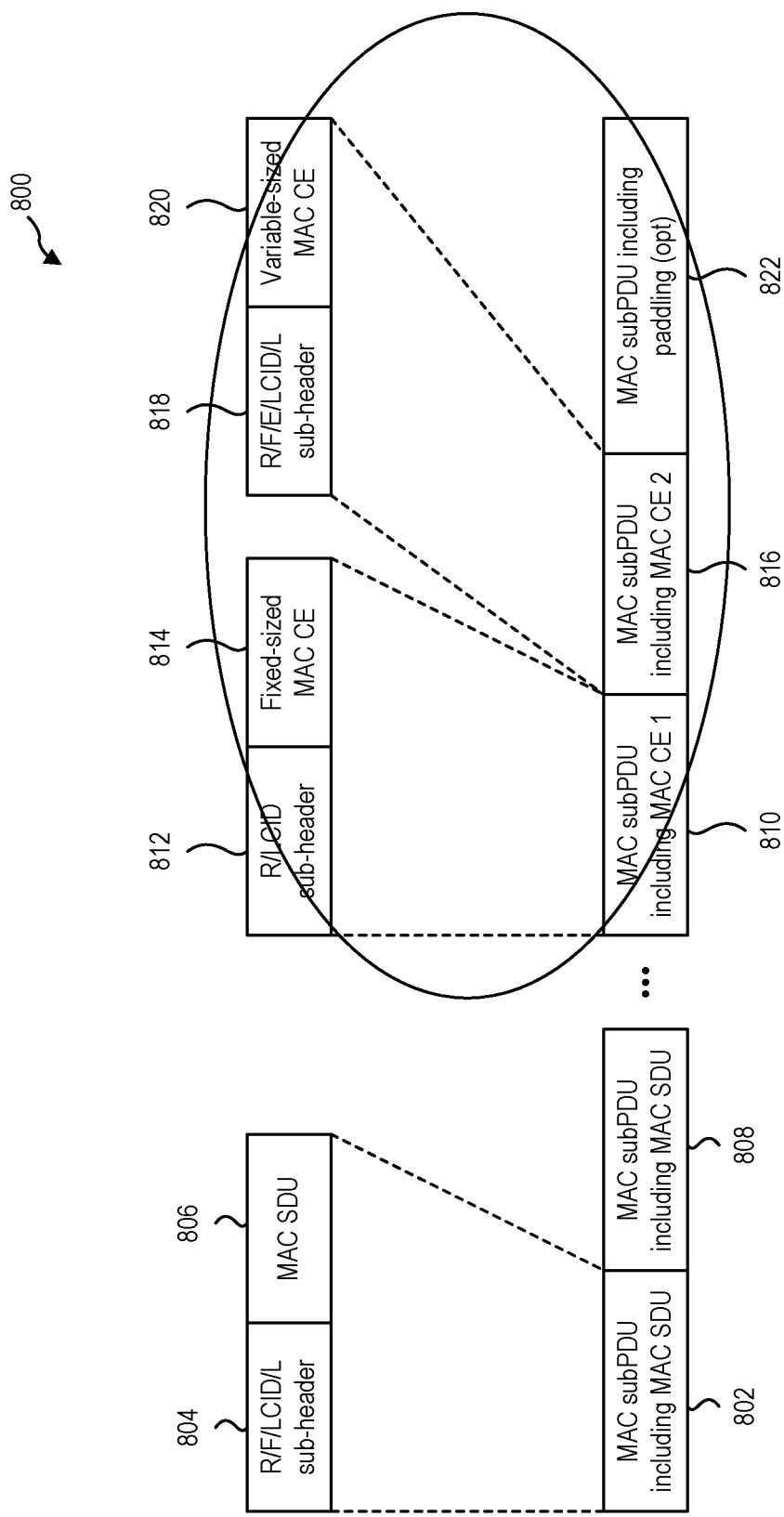
FIG. 8 illustrates an example UL MAC PDU for use with 5G in accordance with an implementation of the present disclosure.

Referring now to FIG. 8, illustrated is an example UL MAC PDU 800 for use with 5G. The UL MAC PDU 800 is constructed by concatenating a plurality of decoded codeblocks 34. In addition, the UL MAC PDU 800 may include MAC subPDUs 802, 808, 810, 816 and may optionally include padding 822. Each subPDUs 802, 808, 810, 816 includes a subheader 804, 812, 818 and information 806, 814, 820 (e.g., MAC SDU (the data) or MAC control elements). The subheader 804, 812, 818 identifies what information 806, 814, 820 follows next and the size of the information 806, 814, 820 (e.g., fixed-sized or variable-sized).

In the illustrated example, subPDU 802 has a subheader 804 that identifies MAC SDU 806 is included in subPDU 802. SubPDU 810 includes a subheader 812 that identifies a fixed-sized MAC control element 814 is included in subPDU 810. SubPDU 816 includes a subheader 818 that identifies a variable-sized MAC control element 816 is included in subPDU 816.

In 5G, MAC control elements are appended at the end of the UL MAC PDU 800 prior to any padding 822 that may be included in the UL MAC PDU 800. Thus, in 5G, instead of sending the first codeblock to the local decoder 28 (FIG.

1) for decoding locally, the codeblock dispatcher component 26 (FIG. 6) sends the last codeblock to the local decoder 28 for decoding locally.

The decoded codeblocks 34 are transmitted to the MAC UL dispatcher component 24 to retrieve the control elements to send to the L2 layer 20 in a new MAC PDU packet 38. MAC UL dispatcher component 24 is unable to retrieve the last codeblock without parsing the UL MAC PDU 800 from the beginning to the end of the UL MAC PDU 800. The UL MAC PDU 800 is constructed to be decoded from the beginning to the end using the information provided in each subheader 804, 812, 818. The MAC UL dispatcher component 24 starts parsing the UL MAC PDU 800 from the start (e.g., MAC subPDU 802) and continues to the next subPDU (e.g., MAC subPDU 808) until the end of the UL MAC PDU 800 (e.g., padding 822). As such, finding control elements and extracting only the last codeblock with only the last codeblock decoded may not be straightforward for the MAC UL dispatcher component 24.

Figure 9:
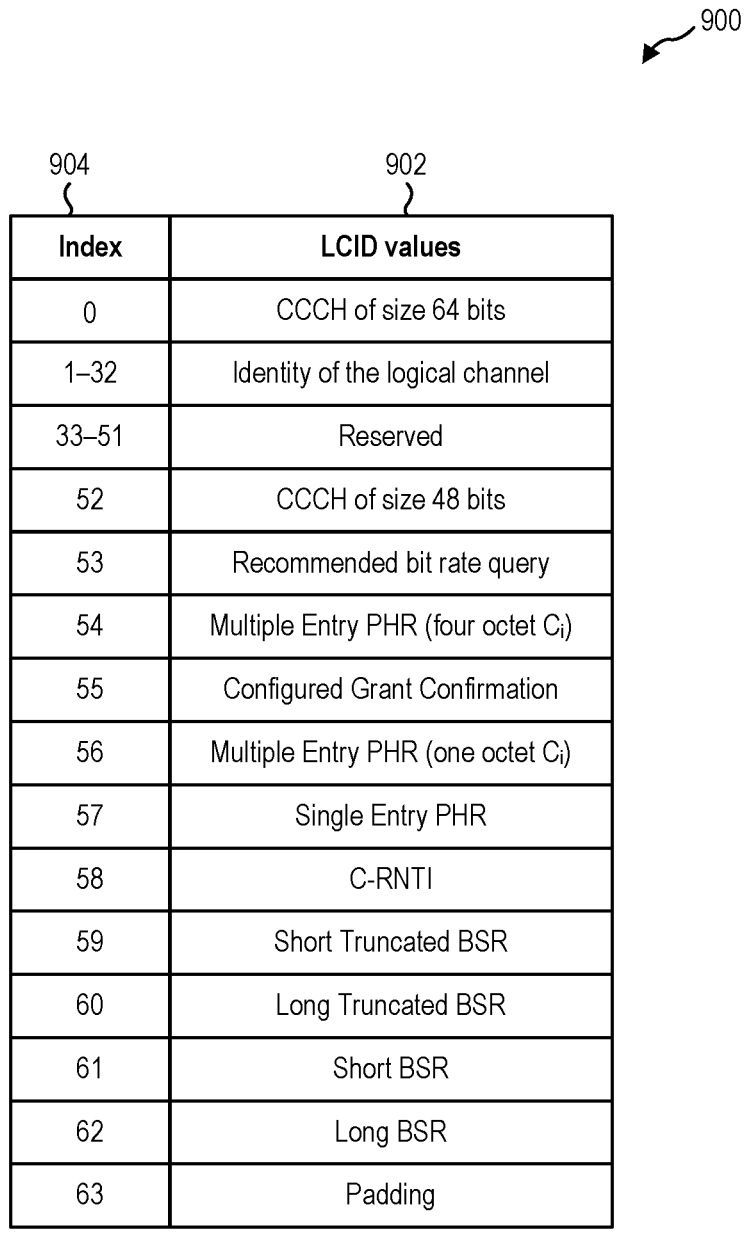
FIG. 9 illustrates an example table for use with identifying codeblocks with MAC control elements in accordance with an implementation of the present disclosure.

Referring now to FIG. 9, the MAC UL dispatcher component 24 (FIG. 6) may use table 900 for identifying the last codeblocks with the MAC control elements for sending to the L2 layer 20 (FIG. 6) MAC control elements have headers that are either in the form "R/F/LCID/L" for variable length control elements or the form "R/R/LCID" for fixed length control elements and padding, where "R" is a single bit set to "0"; "F" is a single bit set to "0" or "1"; "LCID" is a value of 6 bits that indicates a type of control element; and "L" is a bit field of 8 or 16 bits that indicates the length of the MAC SDU or MAC CE (8 bits if "F" is 0, 16 bits otherwise).

Table 900 provides a mapping for the different index values 904 for the LCID values 902 for the different types of control elements. For example, table 900 indicates that the PHR control element maps to an index value of 57. As such, the single entry PHR control element may have a header value of "0011101" (fixed length). Another example may include padding having a header value of "00111111" since padding maps to an index value of 63 in table 900. Another example may include a variable length CE, such as, multiple entry PHR with one octet Ci, may have a header value of "00111000" or "01111000" depending on the length of the control element.

As such, the MAC UL dispatcher component 24 may use table 900 to identify the header values for different control elements. The MAC UL dispatcher component 24 may use this information in the header to extract and identify the different control elements in the last codeblocks for sending to new MAC PDU packet 38 to the L2 layer 20.

Figure 10:
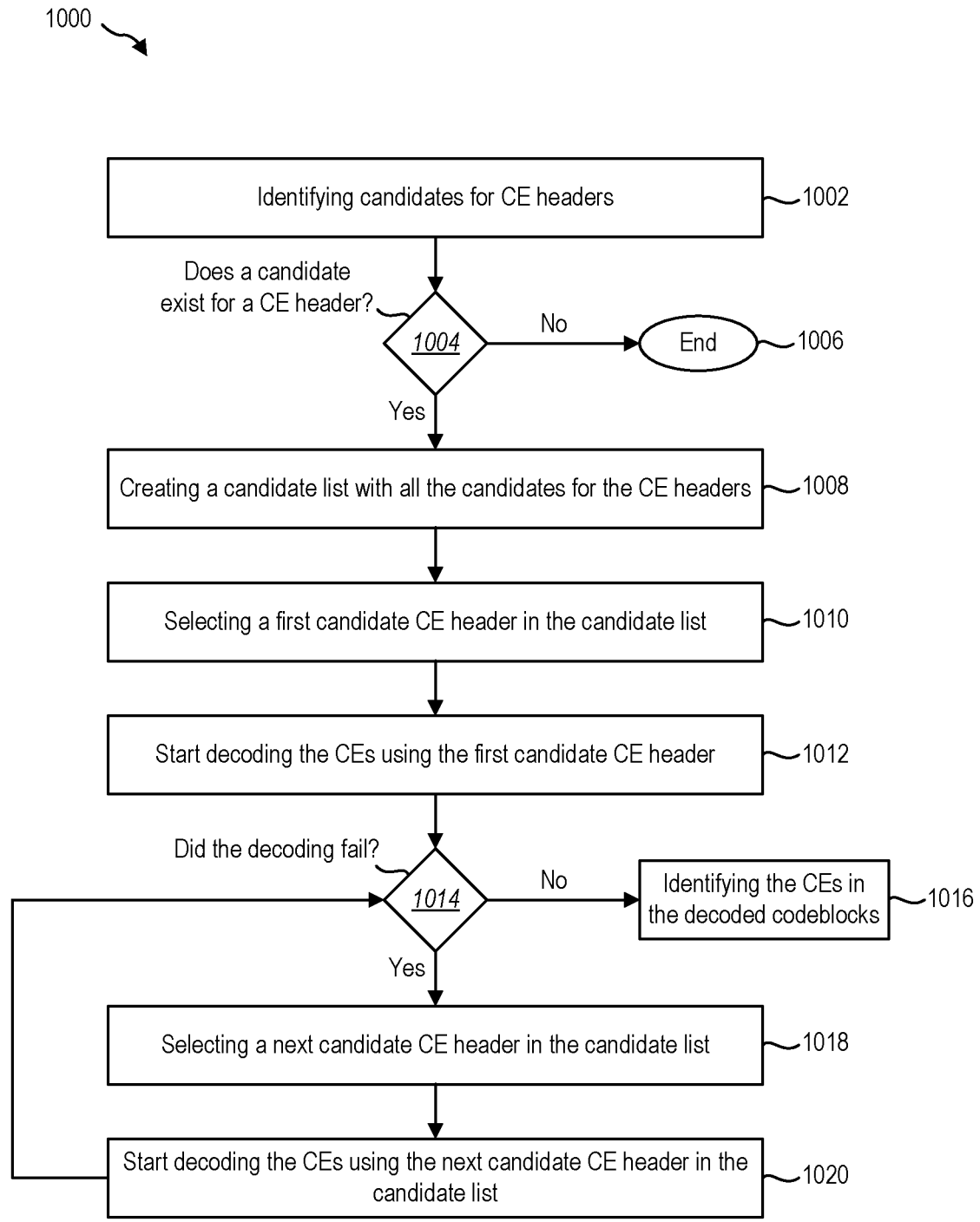
FIG. 10 illustrates an example method for identifying MAC control elements in decoded codeblocks in accordance with an implementation of the present disclosure.

Referring now to FIG. 10, illustrated is an example method 1000 for use by MAC UL dispatcher component 24 (FIG. 6) for identifying MAC control elements in the decoded codeblocks 34 (FIG. 6) received from a local decoder 28 (FIG. 6). Method 1000 may be discussed in connected with the architecture of FIG. 6.

At 1002, method 1000 may include identifying candidates for control element (CE) headers. The MAC UL dispatcher component 24 may compare a string of bits for the decoded codeblocks 34 and to known values of the control element headers. For example, the MAC UL dispatcher component 24 may use table 900 (FIG. 9) with a list of known values for different control element headers. The MAC UL dispatcher component 24 may compare the string of bits of the decoded codeblocks 34 with the values for the control element headers included in table 900. If a match occurs between a portion of the string of bits of the decoded codeblocks 34 and the values for the control element headers, the MAC UL dispatcher component 24 may identify a candidate for the control element header for a control element included in the decoded codeblock 34.

Figures 11A, 11B:
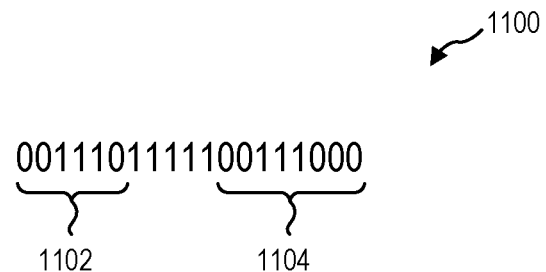
FIGS. 11A and 11B illustrate an example string of bits for a decoded codeblock and an example candidate list with control element header candidates in accordance with an implementation of the present disclosure.

Referring now to FIG. 11A, illustrated is an example portion of a string of bits 1100 for a decoded codeblocks 34. The string of bits 1100 may include the following bits "0011101111100111000." The MAC UL dispatcher component 24 may use table 900 to determine that a match occurred between the bits "0011101" with the header value for a fixed length PHR control element. As such, the bits "0011101" may be identified by the MAC UL dispatcher component 24 as a candidate 1102 for a control header for a fixed length PHR control element. In addition, the MAC UL dispatcher component 24 may use table 900 to determine that a match occurred between the bits "00111000" and a variable length PHR control element. Thus, the bits "00111000" may be identified as a candidate 1104 for a control header for a variable length PHR control element. The MAC UL dispatcher component 24 may move from left to right when analyzing portions of the string of bits 1100 for the decoded codeblocks 34 to determine if any candidates 1102, 1104 for CE headers are in the decoded codeblocks 34. As such, the MAC UL dispatcher component 24 may analyze a first portion of the string of bits 1100 and may continue to analyze a next portion of the string of bits 1100 until the entire string of bits 1100 is analyzed.

At 1004, method 1000 may include determining whether a candidate exists for a control element header. If no candidates exist for the CE header, at 1006, the method ends. For example, if no matches occur between the string of bits 1100 for the decoded codeblocks 34 and the values for the control element headers, the decoded codeblock 34 does not contain any control elements. As such, the MAC UL dispatcher component 24 does not need to pull any control elements from the decoded codeblock 34 to include in the new MAC PDU packet 38. Method 1000 may return to 1002 for a next decoded codeblock 34 received and begin the processing again.

At 1008, method 1000 may include creating a candidate list with all the candidates for the control element headers. The MAC UL dispatcher component 24 may create a candidate list 1106 (FIG. 11B) with all of the identified candidates 1102, 1104 for the CE headers in the string of bits 1100 for the decoded codeblocks 34.

For example, the candidate list 1106 may include a fixed length PHR control element and a variable length PHR control element. The candidate list 1106 may be ordered with the candidate 1102 identified first (e.g., the left most candidate) in the string of bits 1100 followed by the next candidate 1104 identified in the string of bits 1100 moving to the right side of the string of bits 1100 until the end is reached.

At 1010, method 1000 may include selecting a first candidate control element header in the candidate list. The MAC UL dispatcher component 24 may select a first candidate (e.g., candidate 1102) in the candidate list 1106. The first candidate in the candidate list 1106 may be the leftmost candidate identified as a possible candidate by the MAC UL dispatcher component 24.

At 1012, method 1000 may include start decoding the control elements using the first candidate control element header. The MAC UL dispatcher component 24 may start parsing the string of bits 1100 for the decoded codeblocks 34 using the first candidate control element header (e.g., candidate 1102) in the candidate list 1106. The MAC UL dispatcher component 24 may treat the first candidate control element header as an actual header and may parse the string of bits 1100 accordingly.

At 1014, method 1000 may include determining whether the decoding failed. The MAC UL dispatcher component 24 may determine whether the end of the string of bits 1100 for the decoded codeblocks 34 is reached (e.g., the padding and/or the last control element) without a decoding error. If a decoding error did not occur (e.g., the decoding was successful and the end of the string of bits 1100 was reached), at 1016, method 1000 may include identifying the control elements in the decoded codeblocks. The MAC UL dispatcher component 24 may identify control information for the control elements in the decoded codeblocks 34 in response to the decoding being successful using the first candidate CE header. The MAC UL dispatcher component 24 may add the control information for the control elements to a new MAC PDU packet 38 to transmit to the L2 layer 20.

At 1018, method 1000 may include selecting a next candidate control element header in the candidate list. If a decoding error occurred and the MAC UL dispatcher component 24 was unable to reach the end of the string of bits 1100 using the first candidate control element header (e.g., candidate 1102) to parse the string of bits 1100, the MAC UL dispatcher component 24 may select a next candidate control element header (e.g., candidate 1104) in the candidate list 1106.

At 1020, method 1000 may include start decoding the control elements using the next candidate control element header in the candidate list. The MAC UL dispatcher component 24 may start parsing the string of bits 1100 for the decoded codeblocks 34 using the next candidate control element header (e.g., candidate 1104) in the candidate list 1106. The MAC UL dispatcher component 24 may treat the next candidate control element header as an actual header and may parse the string of bits 1100 using the next candidate control element header.

If a decoding error did not occur (e.g., the end of the string of bits 1100 was reached and the decoding was successful), at 1016, method 1000 may end. The MAC UL dispatcher component 24 may identify the control elements in the decoded codeblocks 34 and may add the control elements to a new MAC PDU packet 38 to transmit to the L2 layer 20.

If a decoding error occurred and the MAC UL dispatcher component 24 was unable to reach the end of the string of bits 1100 using the next candidate control element header (e.g., candidate 1104) to parse the string of bits, the MAC UL dispatcher component 24 may select a next candidate control element header in the candidate list 1106 until all of the candidate control element headers included in the candidate list 1106 are used.

Method 1000 may be used by MAC UL dispatcher component 24 to identify MAC control elements in the decoded codeblocks 34 received from a local decoder 28. The MAC UL dispatcher component 24 may create a new MAC PDU packet 38 with the identified control elements to send to the MAC layer. As such, method 1000 may be used by the MAC UL dispatcher component 24 to solve the timing related issues for the UCI and UE feedback. In addition, method 1000 may be used by the MAC UL dispatcher component 24 to solve the timing related issues for uplink retransmission.

Figure 12:
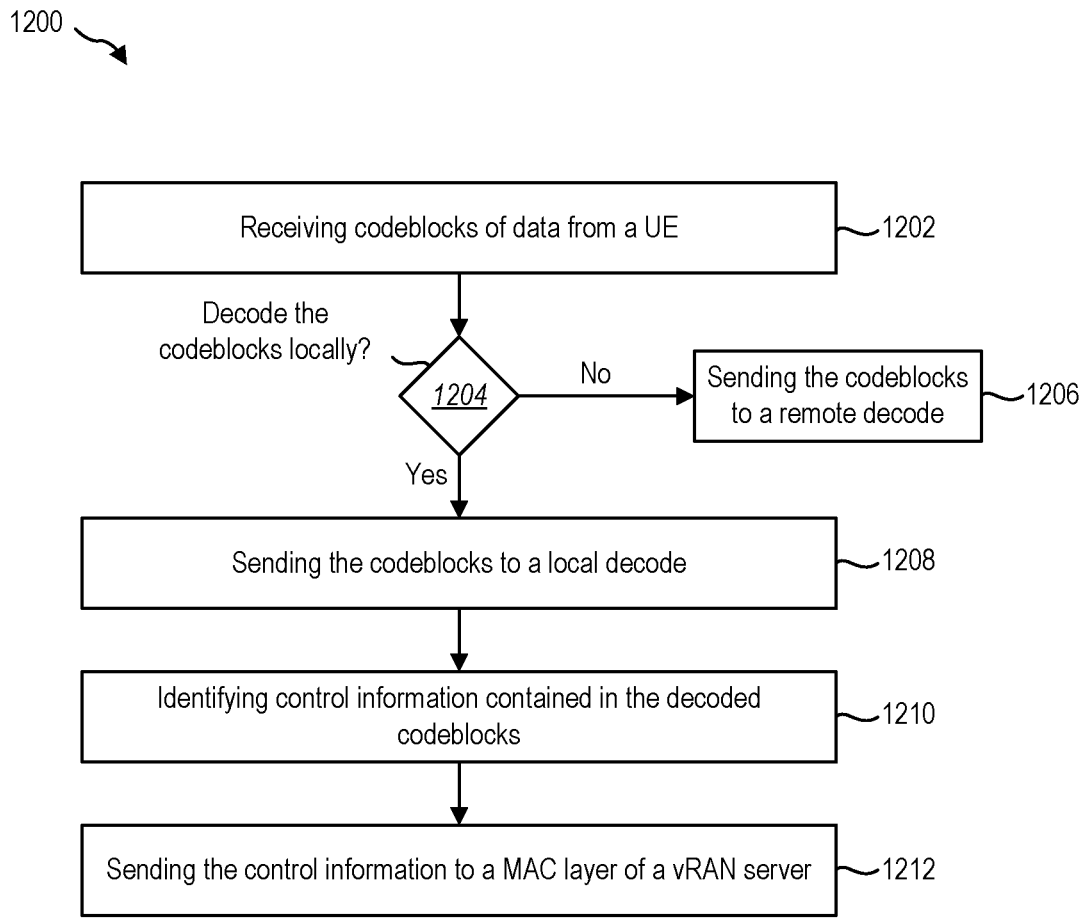
FIG. 12 illustrates an example method for determining where to perform a decoding operation in accordance with an implementation of the present disclosure.

Referring now to FIG. 12, illustrated is a method 1200 for use by a vRAN sever 106 (FIG. 6) for determining whether to perform a decoding operation locally at the far edge 102 (FIG. 6) or offload the decoding operation to a remote location 110 (FIG. 6). The vRAN server 106 may include, a demodulator component 22 (FIG. 6), a codeblock dispatcher component 26 (FIG. 6), a local decoder 28 (FIG. 6), and a MAC UL dispatcher component 24 (FIG. 6) that may implement one or more actions of the method 1200. The decoding operations may be offloaded to the remote location 110 during peak traffic times at the base station 104 (FIG. 1) and/or during an increase in traffic at the base station 104 from one or more UEs 108 (FIG. 1). In addition, the decoding operations may be offloaded anytime the vRAN server 106 is unable to handle the traffic load received from one or more UEs 108 at the base station 104. The actions of method 1200 may be discussed below with reference to the architecture of FIGS. 1 and 6.

At 1202, method 1200 may include receiving codeblocks of data from a user equipment. vRAN server 106 may include a demodulator component 22 that receives data transmitted from one or more UEs 108 in communication with a base station 104 located nearby the vRAN server 106. For example, the vRAN server 106 may be located at the far edge 102 of a network nearby the base station 104 (e.g., within a few kilometers of the antenna of the base station 104). The vRAN server 106 may be a small form factor server relative to larger servers 114 used at a datacenter of the edge 112 and/or larger servers 118 used in the cloud 116. Moreover, the vRAN server 106 may be more energy efficient relative to the servers 114 used at the edge 112 or the servers 118 used in the cloud 116. The demodulator component 22 demodulates the data into codeblocks 32 and may generate a plurality of codeblocks 32 varying in size depending on the amount of data.

At 1204, method 1200 may include determining whether to decode the codeblocks locally. The demodulator component 22 may send the codeblocks 32 to a codeblock dispatcher component 26 that determines whether to perform the decoding for the codeblocks 32 locally or offload the decoding for the codeblocks 32 to a remote location 110.

The codeblock dispatcher component 26 may identify any latency requirements and/or QoS requirements for the codeblock 32 in determining whether to perform the decoding locally or remotely. Different UEs 108 may have a different QoS requirements for receiving data. The UEs 108 may send quality indicators and/or other information of indicate the QoS requirement for the UE 108.

The codeblock dispatcher component 26 may use the information received for the QoS requirements and/or the application latency requirements in determining whether to decode a particular codeblock 32 for a UE 108 locally or remotely. In an implementation, the codeblock dispatcher component 26 may use the a quality of service class identifier (QCI) for 4G and/or a quality of service flow identifier (QFI) for 5G for the codeblock 32 in determining whether the codeblock 32 has a guarantee bit rate requirement.

In an implementation, the codeblock dispatcher component 26 may use the slice ID of a UE 108 in determining whether to decode the codeblocks 32 for the UE 108 remotely or locally. The slice ID may identify whether a UE 108 is mapped as a device that has low latency requirements.

In addition, the codeblock dispatcher component 26 may identify which control blocks contain control information when determining whether to decode the codeblocks locally. As such, the classification of flows and the decision to offload by the codeblock dispatcher component 26 is made based on information from a number of sources, including the QCI/QFI for 4G and 5G correspondingly, as well as the type of slice that the UE belongs to (if network slicing is supported).

At 1206, method 1200 may include sending the codeblocks to a remote decoder. The codeblock dispatcher component 26 may send the codeblocks to a remote decoder 30 at a remote location 110 in response to determining to decode the codeblocks remotely. For example, if the codeblocks 32 do not include control information, the codeblock dispatcher component 26 may send the codeblocks 32 to the remote decoder 30 for decoding remotely. Another example may include sending packets corresponding to applications that do not include latency requirements to the remote decoder 30 for decoding remotely. Another example may include sending the codeblocks 32 for UEs 108 not included in the devices with low latency requirements to the remote decoder 30 for decoding remotely. Another example may include sending the codeblocks 32 to the remote decoder 30 in response to determining that the codeblocks 32 do not include control information.

The remote location 110 may include a higher level edge 112 located further away from the base station 104. For example, the edge 112 may be located within 11 to 200 kilometers from the base station 104. The remote location 110 may also include a cloud 116 deployment located further away from the base station 104 relative to the far edge 102. The servers 114, 118 located at the edge 112 and/or the cloud 116 and may be more powerful relative to the vRAN servers 106 located at the far edge 102. As such, the edge 112 and/or the cloud 116 may include bigger deployments of servers 114, 118 and may provide benefits of pulling more resources for processing the vRAN workloads.

At 1208, method 1200 may include sending the codeblocks to a local decoder. The codeblock dispatcher component 26 may send the codeblocks to a local decoder 28 at the vRAN server 106 in response to determining to decode the codeblocks locally. For example, the codeblock dispatcher component 26 may send the codeblocks 32 for the AR/VR headset to the local decoder 28 because the codeblocks 32 are critical in terms of time. Another example may include sending the codeblocks 32 to the local decoder 28 in response to the QCI and/or the QFI exceeding a threshold level. Another example may include sending the codeblocks 32 to the local decoder 28 in response to the slice ID of the UE 108 matching a group of devices with low latency requirements. Another example may include sending the codeblocks 32 to the local decoder 28 in response to determining that the codeblocks 32 contain control information.

At 1210, method 1200 may include identifying control information contained in the decoded codeblocks. Once the local decoder 28 and/or the remote decoder 30 completes the decoding process, the decoded codeblocks 34 are sent to the MAC UL dispatcher component 24. The MAC UL dispatcher component 24 consolidates the decoded codeblocks 34 into a single MAC PDU packet to send to the L2 layer 20, the MAC layer. The MAC UL dispatcher component 24 separates the control information and data before sending the MAC PDU packet to the L2 layer 20. The MAC UL dispatcher component 24 constructs a new MAC PDU packet 38 that only includes the control information for the codeblocks 32 decoded locally.

In an implementation, the MAC UL dispatcher component 24 may predict the HARQ outcome without decoding the data. The MAC UL dispatcher component 24 may infer whether to send an ACK message or a NACK message from the base station 104 (FIG. 1) for the data received from the UE 108 based on the demodulation prior to decoding the data. The demodulator component 22 may send in-phase and quadrature (IQ) samples 36 of the codeblocks 32 to the MAC UL dispatcher component 24. The MAC UL dispatcher component 24 may use the IQ samples 36 of the codeblocks 32 to make a prediction of whether the outcome for decoding the codeblocks 32 without decoding the codeblocks 32 using an error vector magnitude (EVM) classifier. The MAC UL dispatcher component 24 may set a threshold level for the EVM classifier to use in predicting the outcome of decoding the codeblocks 32. If the EVM crosses the threshold level, the MAC UL dispatcher component 24 may predict that the decoding operation of the codeblocks 32 will fail and reports a NACK message. If the EVM is below the threshold level, the MAC UL dispatcher component 24 may predict a successful decoding operation of the codeblocks 32 and reports an ACK message. The MAC UL dispatcher component 24 may predict the HARQ outcome without decoding the data using the EVM classifier. As such, in the case of offloaded data packets, the base station 104 provides HARQ feedback (ACK/NACK) to the UE 108 for uplink transmissions by relying on the demodulation quality (which always occurs locally with minimal latency), rather than on the outcome of the decoding operation.

At 1212, method 1200 may include sending the control information to a MAC layer of the vRAN server. The MAC UL dispatcher component 24 sends the control information up in the new MAC PDU packet 38 to the MAC layer while the data is decoding remotely. By providing the control information for the codeblocks 32 decoded locally, UL state updates may be provided timelier before the remote decoding is finished.

As such, method 1200 may be used to improve the efficiency of the vRAN server, by allowing the vRAN server to scale capacity beyond the capabilities offered by the vRAN sever hosting the vRANs at the far edge 102 by offloading of part of the vRAN processing to the remote location 110, such as, higher-level edge deployments or to the central cloud. In addition, method 1200 may be used to solve the timing related issues for offloading the decoding operations to a remote location 110. The timing related issues may include, but are not limited to, quality of service requirements of UEs 108 and/or applications the UEs 108 are accessing, timing issues relating to the UCI and UE feedback, and/or the timing related issues for uplink retransmission.

Each of the components described herein may be in communication with each other using any suitable communication technologies. In addition, while the components are shown to be separate, any of the components or subcomponents may be combined into fewer components, such as into a single component, or divided into more components as may serve a particular implementation.

Moreover, the components may include hardware, software, or both. For example, the components may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. When executed by the one or more processors, the computer-executable instructions of one or more computing devices can perform one or more methods described herein. Alternatively, the components may include hardware, such as a special purpose processing device to perform a certain function or group of functions. Additionally, or alternatively, the components may include a combination of computer-executable instructions and hardware.

Instructions and data may be stored in memory. The instructions may be executable by the processor to implement some or all of the functionality disclosed herein.

Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving, at a virtual radio access network (vRAN) server, codeblocks of data from a user equipment in communication with a base station located near the vRAN server, wherein the vRAN server runs on commodity hardware and is in a separate physical location from the base station;
   determining whether to decode the codeblocks locally using a local decoder of the vRAN server or decode the codeblocks remotely using a remote decoder at a remote location based on comparing a slice identifier of the user equipment to a group of slice identifiers, wherein the remote location is located further away from the base station relative to the vRAN server;
sending the codeblocks to the local decoder in response to the slice identifier matching the group of slice identifiers;
sending the codeblocks to the remote decoder in response to a match not occurring between the slice identifier and the group of slice identifiers;
identifying control information contained in decoded codeblocks; and
sending the control information to a medium access control (MAC) layer of the vRAN server.

2. The method of claim 1, wherein determining to decode the codeblocks locally is based on a quality of service requirement for the user equipment or a quality of service requirement of an application being accessed by the user equipment.

3. The method of claim 2, wherein the quality of service requirement is identified by:
comparing a quality of service class identifier (QCI) or a quality of service flow identifier (QFI) to a threshold level;
determining to decode the codeblocks locally in response to the QCI or the QFI exceeding the threshold level; and
determining to decode the codeblocks remotely in response to the QCI or the QFI being below the threshold level.

4. The method of claim 2, wherein the group of slice identifiers of devices belongs to a low latency requirement.

5. The method of claim 1, wherein:
determining to decode the codeblocks locally is based on identifying the codeblocks as containing control information, and
determining to decode the codeblocks remotely is based on the codeblocks not containing the control information.

6. The method of claim 1, wherein identifying the control information contained in the decoded codeblocks further includes:
receiving in-phase and quadrature (IQ) samples of the codeblocks being decoded remotely at the remote decoder;
inferring a predicted outcome of decoding for the codeblocks by comparing an error vector magnitude (EVM) of the IQ samples to a threshold level; and
sending the predicted outcome of the decoding as the control information prior to the decoding of the codeblocks.

7. The method of claim 1, wherein the remote location is one of an edge deployment with a plurality of servers or a cloud deployment with a plurality of servers.

8. A virtual radio access network (vRAN) server, comprising:
a demodulator component that receives codeblocks of data from a user equipment in communication with a base station located near the vRAN server, wherein the vRAN server runs on commodity hardware and is in a separate physical location from the base station;
a local decoder that decodes the codeblocks locally at the vRAN server;
a codeblock dispatcher component that determines whether to decode the codeblocks locally using the local decoder or decode the codeblocks remotely using a remote decoder at a remote location based on comparing a slice identifier of the user equipment to a group of slice identifiers, wherein the codeblock dispatcher component sends the codeblocks to the local decoder in response to the slice identifier matching the group of slice identifiers and sends the codeblocks to the remote decoder in response to a match not occurring between the slice identifier and the group of slice identifiers; and
a medium access control (MAC) uplink (UL) dispatcher component that:
receives decoded codeblocks from the local decoder or the remote decoder,
identifies control information in the decoded codeblocks, and
sends the control information to a MAC layer of the vRAN server.

9. The vRAN server of claim 8, wherein the codeblock dispatcher component uses a quality of service requirement for the user equipment or a quality of service requirement of an application being accessed by the user equipment in determining whether to decode the codeblocks locally or remotely.

10. The vRAN server of claim 8, wherein the codeblock dispatcher component:
identifies the codeblocks that contain control information;
sends the codeblocks to decode locally in response to the codeblocks containing the control information; and
sends the codeblocks that do not include the control information to decode remotely.

11. The vRAN server of claim 8, wherein the MAC UL dispatcher component identifies the control information contained in the decoded codeblocks by:
inferring a predicted outcome of decoding for the codeblocks by comparing an error vector magnitude (EVM) of in-phase and quadrature (IQ) samples of the codeblocks received to a threshold level; and
sending the predicted outcome of the decoding as the control information prior to the decoding of the codeblocks.

12. The vRAN server of claim 8, wherein the MAC UL dispatcher component creates a new MAC protocol data units (PDU) packet with only the control information and sends the control information to the MAC layer using the new MAC PDU packet.

13. The vRAN server of claim 8, wherein the remote location is one of an edge deployment with a plurality of servers located further away from the base station relative to the vRAN server or a cloud deployment with a plurality of servers located further away from the base station relative to the vRAN server.

14. The vRAN server of claim 8, wherein the vRAN server is an energy efficient small form server.

15. A system, comprising:
at least one processor; and
a computer memory comprising instructions that, when executed by the at least one processor, cause the system to carry out operations comprising:
receiving, at a virtual radio access network (vRAN) server, codeblocks of data from a user equipment in communication with a base station located near the vRAN server, wherein the vRAN server runs on commodity hardware and is in a separate physical location from the base station and wherein the vRAN server has less power consumption resources than edges servers located farther away from the base station;
determining whether to decode the codeblocks locally using a local decoder of the vRAN server or decode the codeblocks remotely using a remote decoder at a remote location based on comparing a slice identifier of the user equipment to a group of slice identifiers, wherein the remote location is located further away from the base station relative to the vRAN server;

sending the codeblocks to the local decoder in response to the slice identifier matching the group of slice identifiers;

sending the codeblocks to the remote decoder in response to a match not occurring between the slice identifier and the group of slice identifiers;

identifying control information contained in decoded codeblocks; and sending the control information to a medium access control (MAC) layer of the vRAN server.

16. The system of claim 15, wherein:
determining to decode the codeblocks locally is based on a quality of service requirement for the user equipment; and
the quality of service requirement is identified by comparing a slice identifier of the user equipment to the group of slice identifiers of devices that belong to a low latency requirement.

17. The system of claim 16, wherein the group of slice identifiers of devices belongs to a low latency requirement.

18. The system of claim 15, wherein identifying the control information contained in the decoded codeblocks further includes receiving in-phase and quadrature (IQ) samples of the codeblocks being decoded remotely at the remote decoder.

19. The system of claim 18, wherein identifying the control information contained in the decoded codeblocks further includes inferring a predicted outcome of decoding for the codeblocks by comparing an error vector magnitude (EVM) of the IQ samples to a threshold level.

20. The system of claim 19, wherein identifying the control information contained in the decoded codeblocks further includes sending the predicted outcome of the decoding as the control information prior to the decoding of the codeblocks.

* * * * *